United States Patent
Lanciaux

(10) Patent No.: US 11,473,810 B2
(45) Date of Patent: Oct. 18, 2022

(54) INSULATION STRUCTURES, SYSTEMS AND METHODS FOR UNINSULATED EXISTING DUCTWORK

(71) Applicant: Fran Lanciaux, Grand Rapids, OH (US)

(72) Inventor: Fran Lanciaux, Grand Rapids, OH (US)

(*) Notice: Subject to any disclaimer, the term of this patent is extended or adjusted under 35 U.S.C. 154(b) by 195 days.

(21) Appl. No.: 16/837,056

(22) Filed: Apr. 1, 2020

(65) Prior Publication Data
US 2021/0310691 A1 Oct. 7, 2021

(51) Int. Cl.
| | |
|---|---|
| *F24F 13/02* | (2006.01) |
| *B29C 65/48* | (2006.01) |
| *B29C 65/02* | (2006.01) |
| *B29L 31/10* | (2006.01) |

(52) U.S. Cl.
CPC .......... *F24F 13/0263* (2013.01); *B29C 65/02* (2013.01); *B29C 65/48* (2013.01); *B29L 2031/10* (2013.01)

(58) Field of Classification Search
CPC ...... F24F 13/0263; B29C 65/02; B29C 65/48; B29L 2031/10
USPC ....................................................... 138/149
See application file for complete search history.

(56) References Cited

U.S. PATENT DOCUMENTS

| | | | | |
|---|---|---|---|---|
| 3,251,382 A | * | 5/1966 | Tatsch | F16L 9/003 138/151 |
| 5,020,481 A | * | 6/1991 | Nelson | F24H 1/182 122/19.2 |
| 5,391,840 A | * | 2/1995 | Hughes | H02G 3/0412 174/68.3 |
| 5,549,942 A | * | 8/1996 | Watts | F16L 9/003 138/143 |
| 5,918,644 A | * | 7/1999 | Haack | F16L 9/003 138/151 |
| 6,360,783 B2 | * | 3/2002 | Faverio, IV | F24F 13/0263 138/149 |
| 7,140,396 B2 | * | 11/2006 | Mota | F16L 9/003 138/149 |
| 7,712,787 B2 | * | 5/2010 | Vincenti | F16B 15/0046 285/47 |
| 9,371,941 B1 | * | 6/2016 | Faverio, IV | F24F 13/0263 |
| 10,365,005 B2 | * | 7/2019 | Surraco | B32B 9/041 |
| 10,976,070 B1 | * | 4/2021 | Albers | F24F 13/0263 |
| 2006/0083889 A1 | * | 4/2006 | Schuckers | B32B 7/12 428/58 |
| 2014/0261846 A1 | * | 9/2014 | Lanciaux | E04C 2/328 138/141 |

* cited by examiner

*Primary Examiner* — Craig M Schneider
*Assistant Examiner* — David R Deal
(74) *Attorney, Agent, or Firm* — C. Fred Charpie, III; Ward Law Office LLC

(57) ABSTRACT

An insulation assembly is provided. The insulation assembly includes a three-sided insulation envelope configured to form a cavity. The cavity is configured to receive a section of uninsulated, existing ductwork. The three-sided insulation envelope forms an opening. An insulation cap is configured to seat against the three-sided insulation envelope thereby encapsulating the uninsulated, existing ductwork and sealing the opening.

18 Claims, 15 Drawing Sheets

INSULATION STRUCTURES, SYSTEMS AND METHODS FOR UNINSULATED EXISTING DUCTWORK

BACKGROUND

Commercial and residential buildings have thermal distribution systems, many of which are air-based that distribute air through ductworks. Newer thermal distribution ductwork systems are typically insulated to limit leakage and conduction-loss problems. However, many older, existing thermal distribution ductwork systems are not insulated. Uninsulated thermal distribution ductwork systems in commercial buildings can be similar to those in residential construction and can have similar leakage and conduction-loss problems. The extent of the duct-related thermal losses in uninsulated thermal distribution ductwork systems can depend on the location of the ductwork. In certain instances, large thermal losses can occur when significant portions of the uninsulated ductworks are located outside the building envelope.

Leakage, conduction losses, direct solar radiation effects and solar reflection all affect the magnitude of thermal loss in uninsulated ductworks. Differences in the lengths of exterior uninsulated ductworks also affect a distribution system's energy efficiency, as well as the temperature of air delivered to interior spaces at the registers. When long duct runs are exposed to sunlight and high outdoor temperatures on roofs, the supply air can experience a significant configuration temperature rise before reaching the registers during periods of demand for interior cooling. This configuration can have a direct impact on interior thermal comfort conditions and can cause uneven temperature distribution within the building.

It would be advantageous if uninsulated, existing ductworks could be easily insulated.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the insulation structures, systems and methods for uninsulated, existing ductwork.

The above objects as well as other objects not specifically enumerated are achieved by an insulation assembly. The insulation assembly includes a three-sided insulation envelope configured to form a cavity. The cavity is configured to receive a section of uninsulated, existing ductwork. The three-sided insulation envelope forms an opening. An insulation cap is configured to seat against the three-sided insulation envelope thereby encapsulating the uninsulated, existing ductwork and sealing the opening.

The above objects as well as other objects not specifically enumerated are also achieved by a method of using an insulation assembly. The method includes the steps of forming a cavity with a three-sided insulation envelope, the cavity configured to receive a section of uninsulated, existing ductwork, the three-sided insulation envelope forming an opening and seating an insulation cap against the three-sided insulation envelope, thereby encapsulating the uninsulated, existing ductwork and sealing the opening.

The above objects as well as other objects not specifically enumerated are also achieved by an insulation assembly. The insulation assembly includes a three-sided insulation envelope configured to form a cavity. The cavity is configured to receive a section of uninsulated, existing ductwork. The three-sided insulation envelope forms an opening. A remaining section of duct board is connected to the three-sided insulation envelope and is configured for rotation to seat against the three-sided insulation envelope thereby encapsulating uninsulated, existing duct work and sealing the opening.

Various objects and advantages of the insulation structures, systems and methods for uninsulated, existing ductwork will become apparent to those skilled in the art from the following detailed description, when read in light of the accompanying drawings.

DETAILED DESCRIPTION

Figure 1:
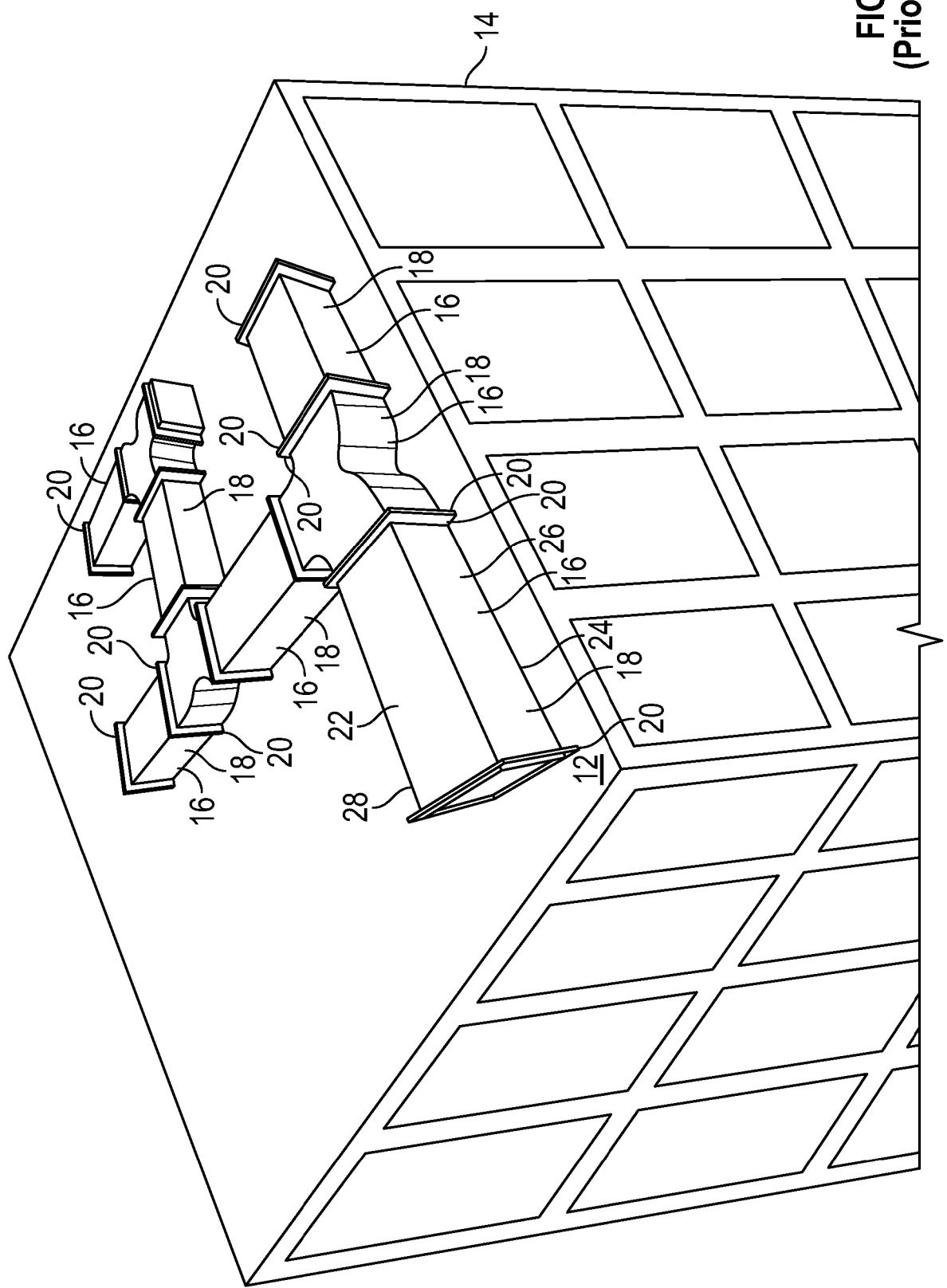
FIG. 1 is a perspective view of a first embodiment of a conventional uninsulated, existing ductwork.

The insulation structures, systems and methods for uninsulated, existing ductwork will now be described with occasional reference to specific embodiments. The insulation structures, systems and methods for uninsulated, existing ductwork may, however, be embodied in different forms and should not be construed as limited to the embodiments set forth herein. Rather, these embodiments are provided so that this disclosure will be thorough and complete and will fully convey the scope of the insulation structures, systems and methods for uninsulated, existing ductwork.

Unless otherwise defined, all technical and scientific terms used herein have the same meaning as commonly understood by one of ordinary skill in the art to which the insulation structures, systems and methods for uninsulated, existing ductwork belongs. The terminology used in the description of the insulation structures, systems and methods for uninsulated, existing ductwork herein is for describing particular embodiments only and is not intended to be limiting of the insulation structures, systems and methods for uninsulated, existing ductwork. As used in the description of the insulation structures, systems and methods for uninsulated, existing ductwork and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the insulation structures, systems and methods for uninsulated, existing ductwork. Notwithstanding that the numerical ranges and parameters setting forth the broad scope of the insulation structures, systems and methods for uninsulated, existing ductwork are approximations, the numerical values set forth in the specific examples are reported as precisely as possible. Any numerical values, however, inherently contain certain errors necessarily resulting from error found in their respective measurements.

The description and figures disclose novel insulation structures, systems and methods for uninsulated, existing ductwork, Generally, the novel insulation structures, systems and methods for uninsulated, existing ductwork incorporate an insulation assembly having a folded insulation envelope. The folded insulation envelope forms a cavity configured to receive and encapsulate a section of uninsulated, existing ductwork. The encapsulating of the uninsulated, existing ductwork can be accomplished without disruption of the uninsulated, existing ductwork and without disruption of the air flowing within the uninsulated, existing ductwork.

The term "ductwork", as used herein, is defined to mean any structure, device or mechanism used in heating, ventilation, and air conditioning to deliver and remove air.

Referring now to FIG. 1, a first embodiment of an uninsulated, existing ductwork (hereafter "ductwork") is shown generally at 10. The ductwork 10 is configured as an air-based, thermal distribution system that is conventional in the art. In the illustrated embodiment, the ductwork 10 is positioned on a roof 12 of a building 14, although such is not necessary. The ductwork 10 includes a plurality of hollow sections 16, each bounded by a rectangular or square circumferential covering 18. Flanges 20 are typically formed at the ends of the sections 16 and used to connect adjacent sections 16 together.

Referring again to FIG. 1, each of the sections 16 has an upper face 22, an opposing lower face 24, a first side face 26 and a second side face 28. Each of the faces 22, 24, 26 and 28 will be discussed in more detail below.

Figure 2:
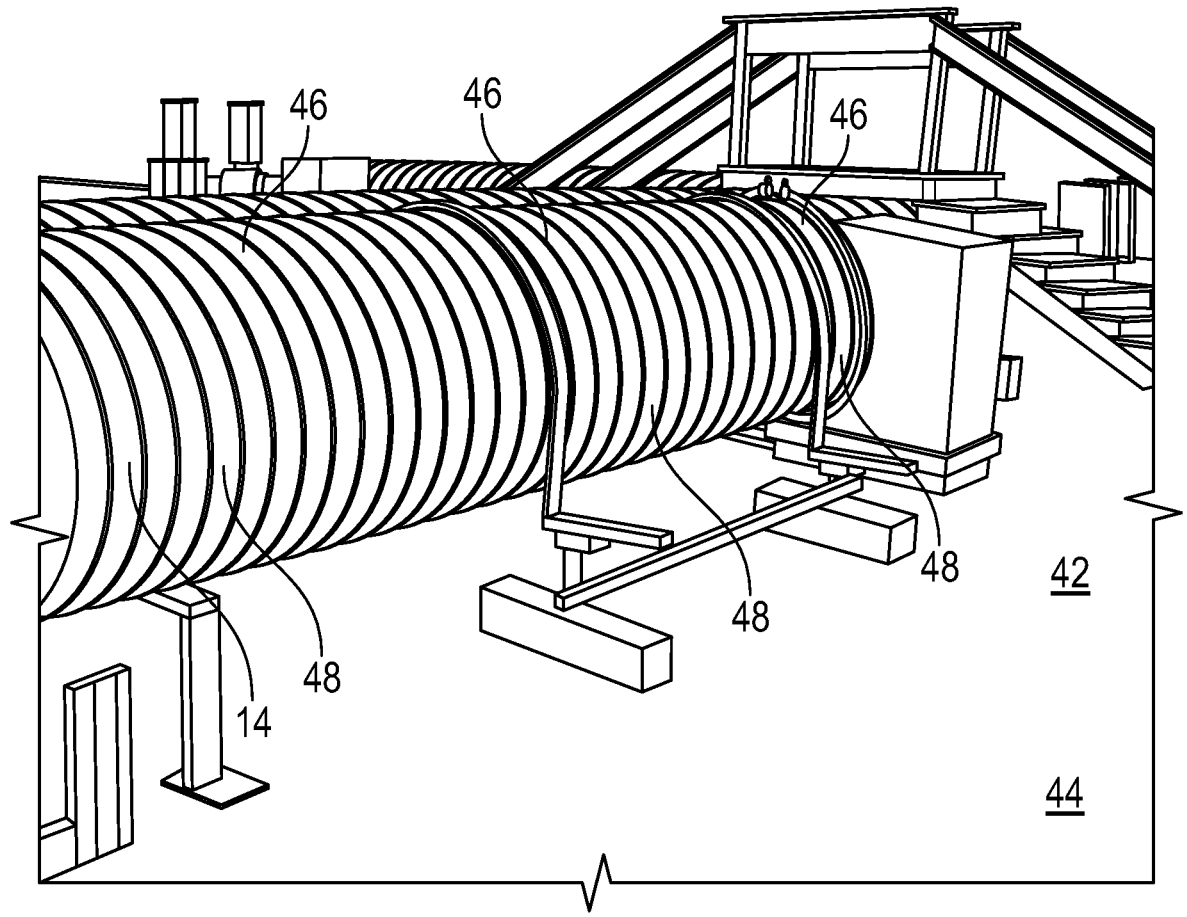
FIG. 2 is a perspective view of a second embodiment of a conventional uninsulated, existing ductwork.

Referring now to FIG. 2, a second embodiment of an uninsulated, existing ductwork is shown generally at 40. The ductwork 40 is also configured as an air-based, thermal distribution system that is conventional in the art. In the illustrated embodiment, the ductwork 40 is positioned on a roof 42 of a building 44, although such is not necessary. The ductwork 40 includes a plurality of hollow sections 46, each bounded by a circular circumferential covering 48. The circumferential coverings 48 have an outer face 50, which will be discussed in more detail below.

Figure 3:
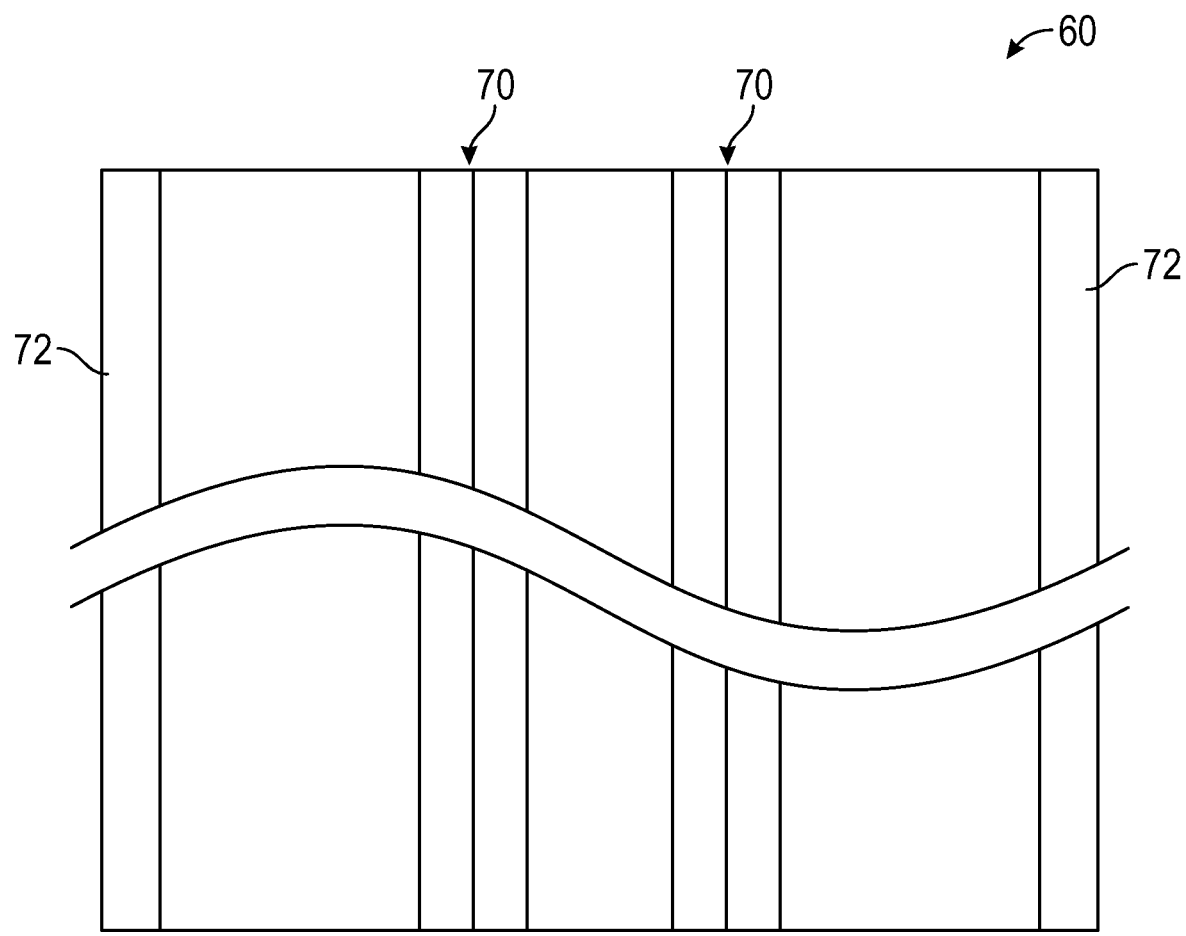
FIG. 3 is a plan view of a first embodiment of a duct board with three panels defined by two V-shaped grooves formed in the duct board for forming a three-sided insulation envelope according to the invention.
Figure 4:
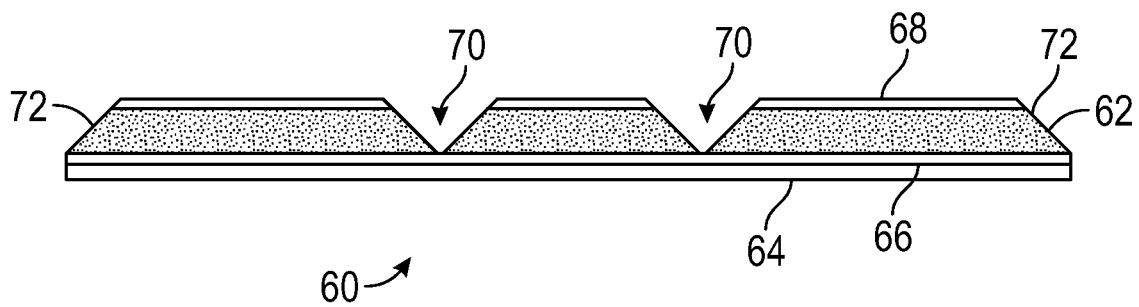
FIG. 4 in an end view of the duct board of FIG. 3.

Referring now to FIGS. 3 and 4, duct board according to the present invention is indicated generally at 60. The duct board 60 is a laminate comprising more than one material. The duct board 60 comprises a layer of foam insulation panel 62 and a sheet of thermoplastic polymer 64. The thermoplastic polymer sheet 64 may have any one of a range of thicknesses. For example, a range of 0.3 mm to 2.0 mm is suitable. A thickness of 1.0 mm is suitable for use with the foam panels specifically disclosed and described below.

Referring again to FIGS. 3 and 4, the foam insulation panel 62 may be faced with opposing facing sheets 66 and 68. The facing sheets 66, 68 can be formed from scrimmed aluminum foil or any other acceptable facing material. Excellent results have been obtained where the foam insulation panel 62 is one that is available from Kingspan under the trademark KoolDuct®. It is a rigid phenolic insulation, panel that has a rigid phenolic insulation core with zero Ozone Depletion Potential (ODP), autohesively bonded on both sides to a 1 mil low vapor permeability aluminum foil facing reinforced with a 0.2" glass scrim. KoolDuct rigid phenolic insulation panels are available in thicknesses of ⅞", 1³⁄₁₆" and 1⁵⁄₁₆". KoolDuct panels are approximately four feet wide and come in lengths of ten feet and thirteen feet. It has a high R-value, excellent fire and heat resistance properties, and it is a closed cell foam. KoolDuct is distributed with foil facing layers. While the foam insulation panel 62 has been described above as being formed from Kool-Duct®, it should be appreciated that other suitable foam insulation panels can be used.

Referring again to FIGS. 3 and 4, the thermoplastic polymer sheet 64 is formed from a thermoplastic material and good results have been obtained using PVC thermoplastic sheet material. In a finished duct, the thermoplastic polymer sheet 64 will be on the outside and so the material should be selected for this type of service. In certain instances, the thermoplastic polymer sheet 64 can contain additives to prolong its service life. As one non-limiting example, lithium oxide may be added to improve resistance to degradation caused by ultraviolet radiation. The thermoplastic polymer sheet 64 is securely bonded to the foam insulation panel 62. Excellent results have been obtained with polyurethane adhesive systems. In any case, a strong and secure bond is required between the foam insulation panel 62 and the thermoplastic polymer sheet 64.

While the duct board 60 has been shown in FIGS. 3 and 4 and described above as having a layer of foam insulation panel 62 adhered to a sheet of thermoplastic polymer 64, it is contemplated that in other embodiments, other suitable materials can be used in lieu of the thermoplastic polymer 64. Non-limiting examples of suitable materials include metallic materials, metallic alloy-based materials, carbon-fiber materials and the like.

Referring again to FIGS. 3 and 4, a plurality of V-shaped grooves, indicated at 70, have been formed in the duct board 60 to form faces that form an angle of approximately 90 degrees. Edges 72 of the duct board 60 have been chamfered to an angle of approximately 45 degrees.

Figure 5:
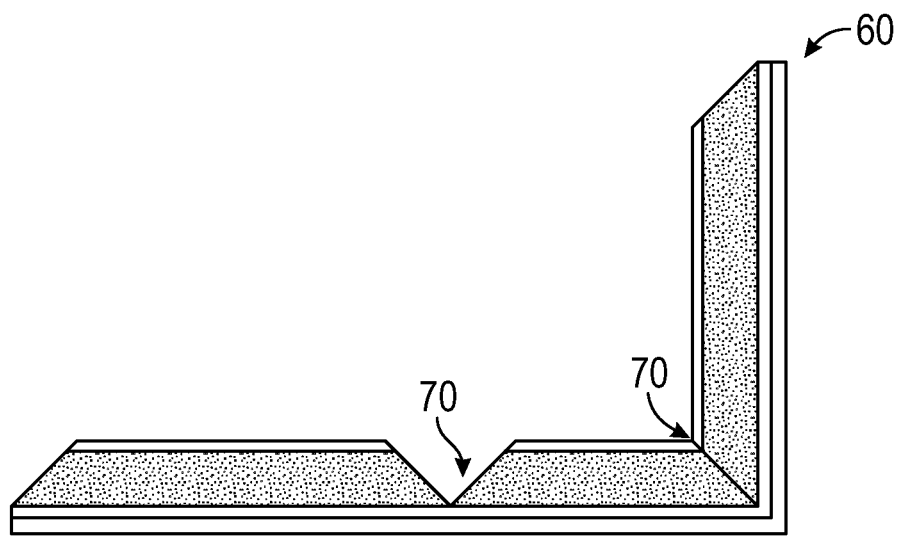
FIG. 5 is an end view of the duct board of FIG. 3 after the duct board has been folded along a first V-shaped groove.
Figure 6:
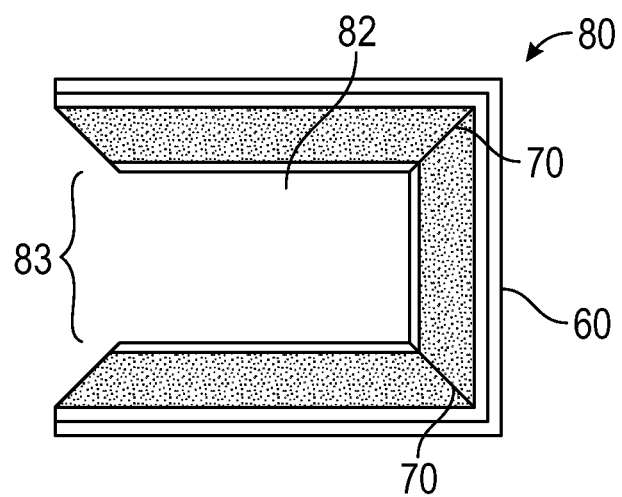
FIG. 6 is an end view of the duct board of FIG. 5 after the duct board has been folded along a second V-shaped groove.

Referring now to FIGS. 5-10, the method of forming the duct board 60 into an insulating assembly will now be discussed. Referring now to FIGS. 5 and 6 in first and second steps, the duct board 60 is folded twice along the V-shaped grooves 70 to form a three-sided insulation envelope 80. The three-sided insulation envelope 80 forms a cavity 82 therewithin and an opening 83. The cavity 82 has a rectangular or square cross-sectional shape corresponding to the rectangular or square cross-sectional shape of an intended ductwork to be insulated. The cavity 82 has a length and height corresponding to length and height of the intended ductwork.

Figure 7:
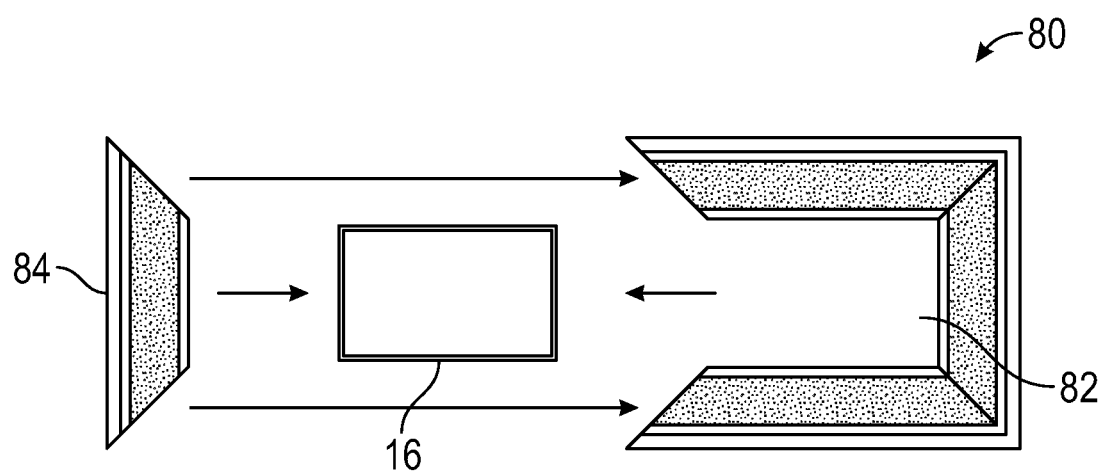
FIG. 7 is an end view of the duct board of FIG. 6 illustrating a cavity within the duct board configured to receive a section of uninsulated, existing ductwork.

Referring now to FIG. 7 in a next step, the three-sided insulation envelope 80 is installed on a section 16 of uninsulated, existing ductwork by sliding the three-sided insulation envelope 80 over the section 16 in a manner such that the section 16 seats within the cavity 82.

Figure 8:
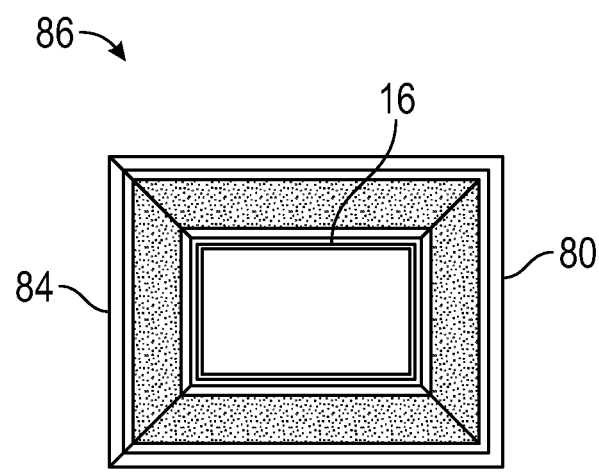
FIG. 8 is an end view of an insulation assembly having a section of uninsulated, existing ductwork seated within a cavity formed by the duct board of FIG. 6 and an insulation cap sealing an opening in the duct board.

Referring again to FIG. 7 in a next step, an insulation cap 84 is aligned with the three-sided insulation envelope 80 in a manner such that the insulation cap 84 seats against the section 16 and the three-sided insulation envelope 80 and covers the opening 83, as shown in FIG. 8. Taken together, the three-sided insulation envelope 80 and the insulation cap 84 form an insulation assembly 86.

Figure 9:
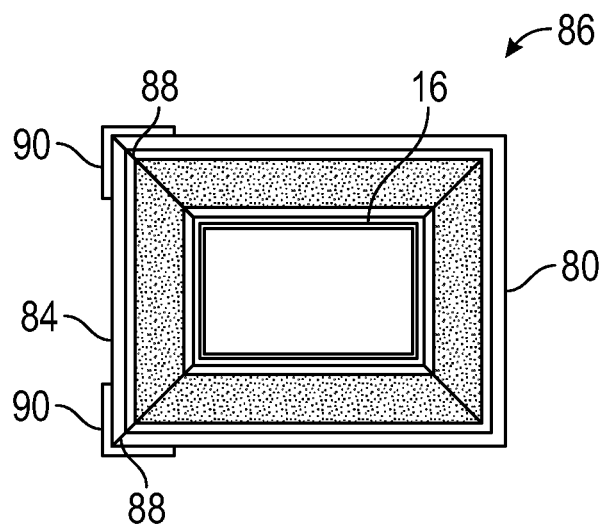
FIG. 9 is an end view of the insulation assembly of FIG. 8 shown with a plurality of sealing strips.
Figure 10:
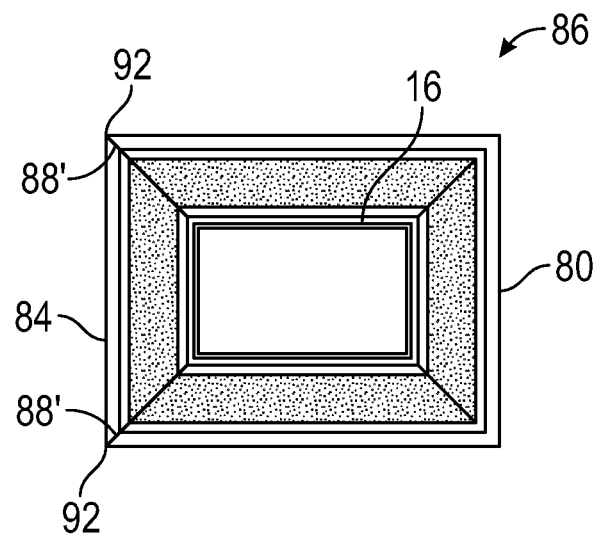
FIG. 10 is an end view of the insulation assembly of FIG. 8 shown with welded seams.

Referring now to FIGS. 9 and 10, the insulation assembly 86 includes raw edges 88 where the two chamfered side edges of the insulation cap 84 seat against the chamfered edges of the three-sided insulation envelope 80. The edges 88 should be sealed and this can be done in a variety of ways. Referring now to FIG. 9 in a first sealing method, the raw edges 88 are sealed with thermoplastic right-angle strips 90, which in certain embodiments have the same composition as the thermoplastic polymer sheet 64. The right-angle strips 90 are bonded to the thermoplastic polymer sheet 64 to close the raw edges 88 and seal them against the environmental influences.

Referring now to FIG. 10, a second sealing method is presented. In this method, the two raw edges 88' have been welded together, as indicated at 92 using a rod made of thermoplastic polymer, which, again, is preferably the same composition as the thermoplastic polymer sheet 64. In still other embodiments, a seal can be made with caulk or other filler material.

Figure 11:
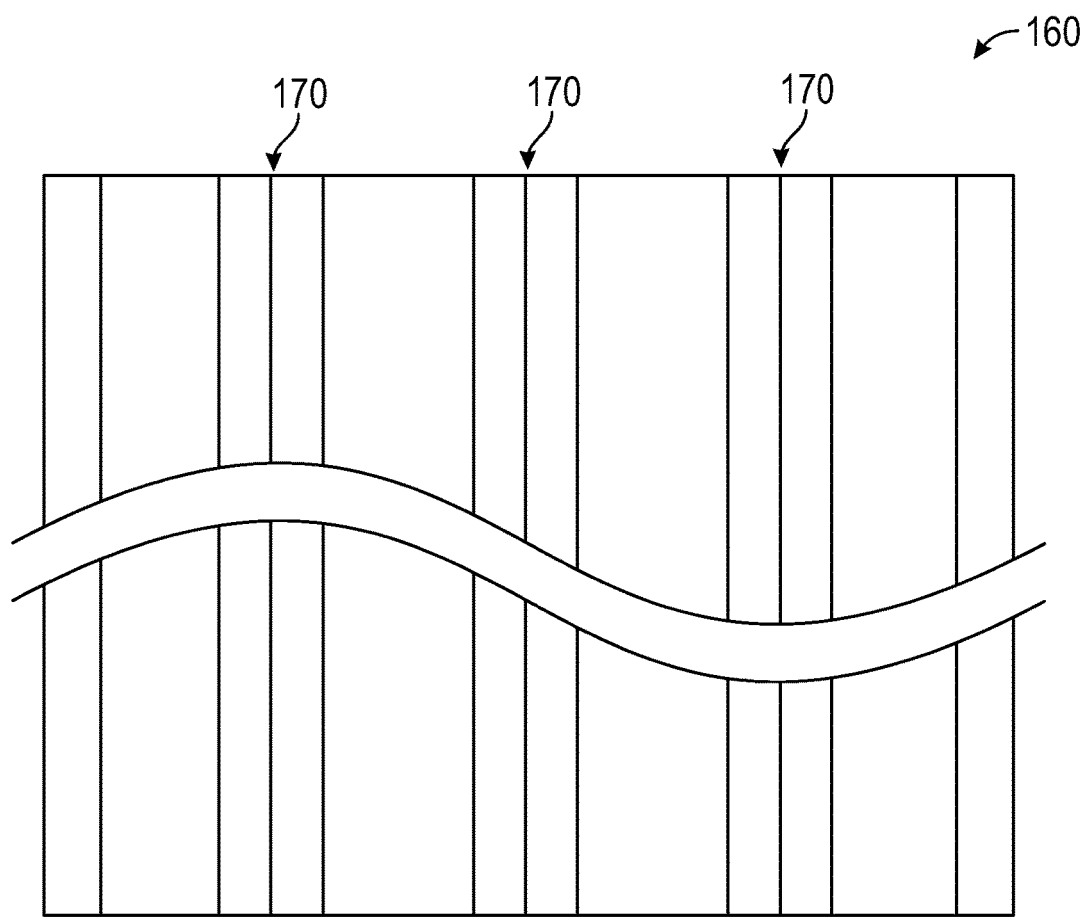
FIG. 11 is a plan view of a second embodiment of a duct board having four panels defined by three V-shaped grooves formed in the duct board for forming a four-sided insulation envelope according to the invention.
Figure 12:
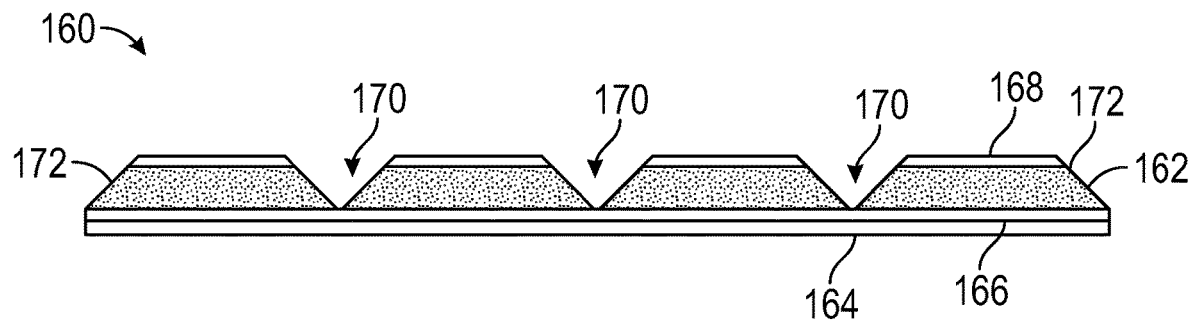
FIG. 12 in an end view of the duct board of FIG. 11.

While the embodiment of the insulation assembly 86 shown in FIGS. 7-10 includes a three-sided insulation envelope 80 and an insulation cap 84, it should be appreciated that an insulation assembly can be formed from other structures. Referring now to FIGS. 11 and 12, an alternate duct board according to the present invention is indicated generally at 160. The duct board 160 includes a layer of foam insulation panel 162, a sheet of thermoplastic polymer 164 and opposing facing sheets 166 and 168. In the illustrated embodiment, the layer of foam insulation panel 162, a sheet of thermoplastic polymer 164 and opposing facing sheets 166 and 168 are the same as, or similar to, the layer of foam insulation panel 62, a sheet of thermoplastic polymer 64 and opposing facing sheets 66 and 68 shown in FIGS. 3 and 4 and described above. However, it should be appreciated that in other embodiments, the layer of foam insulation panel 162, a sheet of thermoplastic polymer 164 and opposing facing sheets 166 and 168 can be different from the layer of foam insulation panel 62, a sheet of thermoplastic polymer 64 and opposing facing sheets 66 and 68.

Referring again to FIGS. 11 and 12, a plurality of V-shaped grooves, indicated at 170, have been formed in the duct board 160 to form faces that form an angle of approximately 90 degrees. Edges 172 of the duct board 160 have been chamfered to an angle of approximately 45 degrees.

Figure 13:
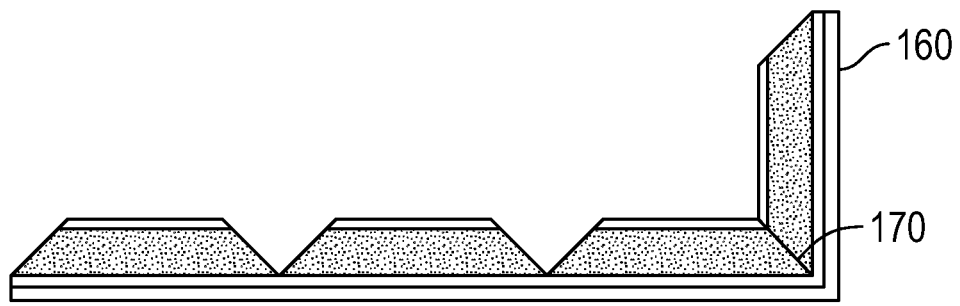
FIG. 13 is an end view of the duct board of FIG. 11 after the duct board has been folded along a first V-shaped groove.
Figure 14:
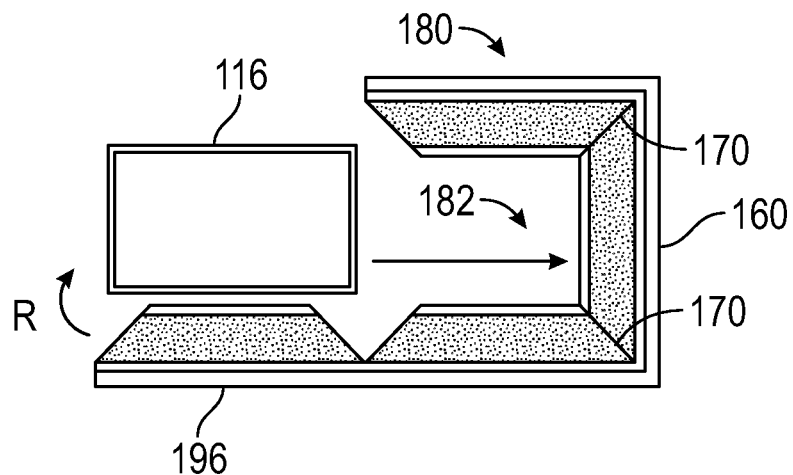
FIG. 14 is an end view of the duct board of FIG. 13 after the duct board has been folded along a second V-shaped groove, illustrating a cavity within the duct board configured to receive a section of uninsulated, existing ductwork and a rotatable remaining section.
Figure 15:
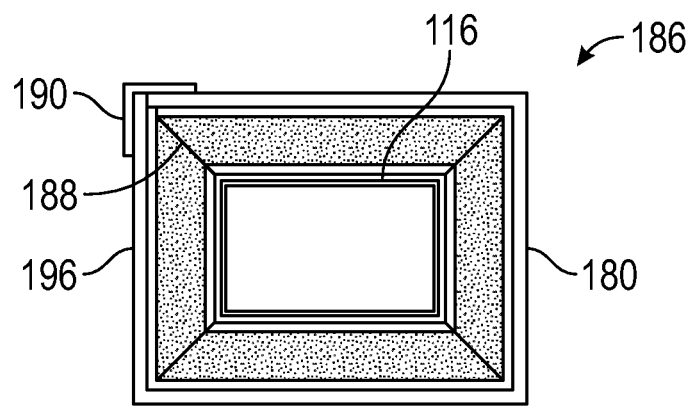
FIG. 15 is an end view of an insulation assembly having a section of uninsulated, existing ductwork seated within a cavity formed by the duct board of FIG. 14 and the rotatable remaining section of FIG. 14.

Referring now to FIGS. 13-15, the method of forming the duct board 160 into an insulating assembly will now be discussed. Referring now to FIG. 13 in first step, the duct board 160 is folded along a first V-shaped groove 170 to form an L-shaped structure. Referring now to FIG. 14, the duct board 160 is folded along a second V-shaped groove to form a three-sided insulation envelope 180. The three-sided insulation envelope 180 forms a cavity 182 therewithin and an opening 183. The cavity 182 has a rectangular or square cross-sectional shape corresponding to the rectangular or square cross-sectional shape of an intended ductwork to be insulated. The cavity 182 has a length and height corresponding to length and height of the intended ductwork.

Referring again to FIG. 14 in a next step, the three-sided insulation envelope 180 is installed on a section 116 of uninsulated, existing ductwork by sliding the three-sided insulation envelope 180 over the section 116 in a manner such that the section 116 seats within the cavity 182.

Referring again to FIG. 14 in a next step, a remaining section 196 of the duct board 160 is rotated in a direction R in a manner such that the remaining section 196 seats against three-sided insulation envelope 180 and covers the opening

183. Taken together, the three-sided insulation envelope 180 and the rotated section 196 form an insulation assembly 186, as shown in FIG. 15.

Referring again to FIG. 15, the insulation assembly 186 includes a raw edge 188 where the chamfered side edge of the rotated section 196 seats against the chamfered edge of the three-sided insulation envelope 180. It is contemplated that the raw edge 188 can be sealed using a thermoplastic right-angle strip 190 or by welding as discussed above.

Figure 16:
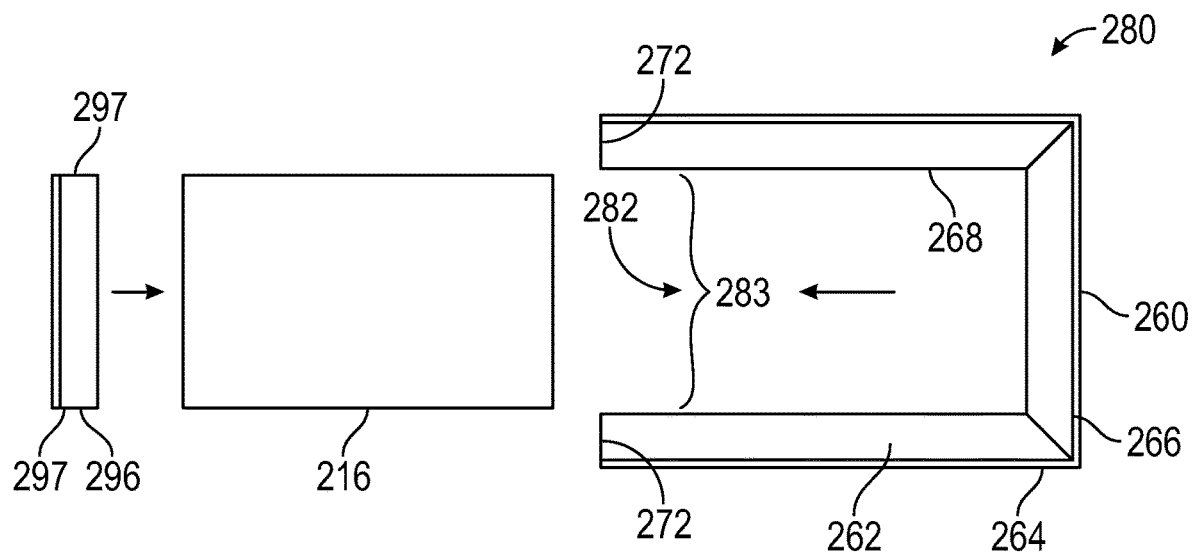
FIG. 16 is an end view of a duct board formed into a three-sided insulation envelope, illustrating a cavity within the duct board configured to receive a section of uninsulated, existing ductwork and an unattached remaining section.
Figure 17:
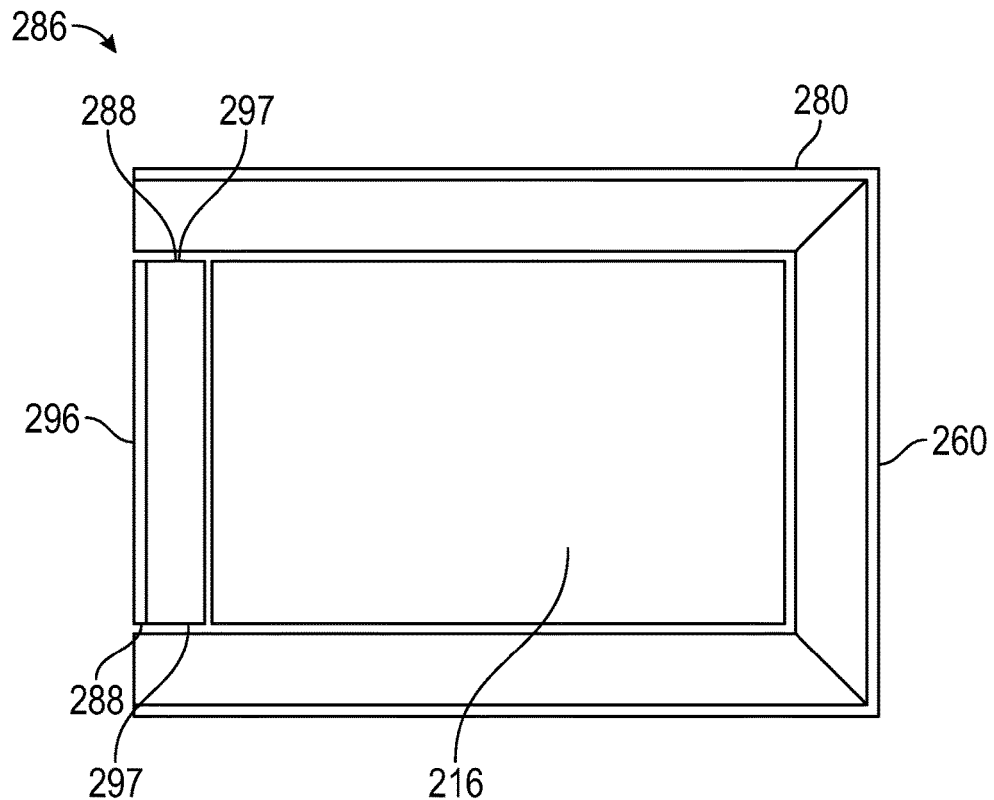
FIG. 17 is an end view of an insulation assembly having a section of uninsulated, existing ductwork seated within a cavity formed by the three-sided insulation envelope of FIG. 16 and the remaining section of FIG. 16 used to seal an opening in the three-sided insulation envelope.

While the embodiments of the duct boards 60, 160 shown in FIGS. 3-15 included chamfered edges 72, 172 it should be appreciated that an insulation assembly can be formed with other structures. Referring now to FIGS. 16 and 17, an alternate duct board 260 is used to form a three-sided envelope 280. The duct board 260 includes a layer of foam insulation panel 262, a sheet of thermoplastic polymer 264 and opposing facing sheets 266 and 268. In the illustrated embodiment, the layer of foam insulation panel 262, a sheet of thermoplastic polymer 264 and opposing facing sheets 266 and 268 are the same as, or similar to, the layer of foam insulation panel 62, a sheet of thermoplastic polymer 64 and opposing facing sheets 66 and 68 shown in FIGS. 3 and 4 and described above. However, it should be appreciated that in other embodiments, the layer of foam insulation panel 262, a sheet of thermoplastic polymer 264 and opposing facing sheets 266 and 268 can be different from the layer of foam insulation panel 62, a sheet of thermoplastic polymer 64 and opposing facing sheets 66 and 68.

Referring again to FIGS. 16 and 17, edges 272 of the duct board 260 have a square cross-sectional shape, that is, the edges 272 are not chamfered as are the edges 72 shown in FIGS. 4 and 12 and described above.

Referring again to FIGS. 16 and 17, the method of forming the duct board 260 into the three-sided envelope 280 is the same as, or similar to the method of forming the duct board 60 into the three-sided envelope 80 as illustrated in FIG. 7 and described above. The three-sided insulation envelope 280 forms a cavity 282 therewithin and an opening 283. The cavity 282 has a rectangular or square cross-sectional shape corresponding to the rectangular or square cross-sectional shape of an intended ductwork to be insulated. The cavity 282 has a length and height corresponding to length and height of the intended ductwork.

Referring again to FIG. 16 in a next step, the three-sided insulation envelope 280 is installed on a section 216 of uninsulated, existing ductwork by sliding the three-sided insulation envelope 280 over the section 216 in a manner such that the section 216 seats within the cavity 282.

Referring again to FIG. 16 in a next step, a remaining section 296 of the duct board 260, also having a square cross-sectional shape 297, is inserted into the opening 283 in a manner such that the edges 297 of the remaining section 296 seats against portions of the three-sided insulation envelope 280 and covers the opening 283. Taken together, the three-sided insulation envelope 280 and the inserted section 296 form an insulation assembly 286, as shown in FIG. 17.

Referring again to FIG. 17, the insulation assembly 286 includes a raw seam 288 where the edge 297 of the inserted section 296 seats against portions of the three-sided insulation envelope 280. It is contemplated that the raw edge 288 can be sealed using a thermoplastic strip (not shown for purposes of clarity) or by welding as discussed above.

Figure 18:
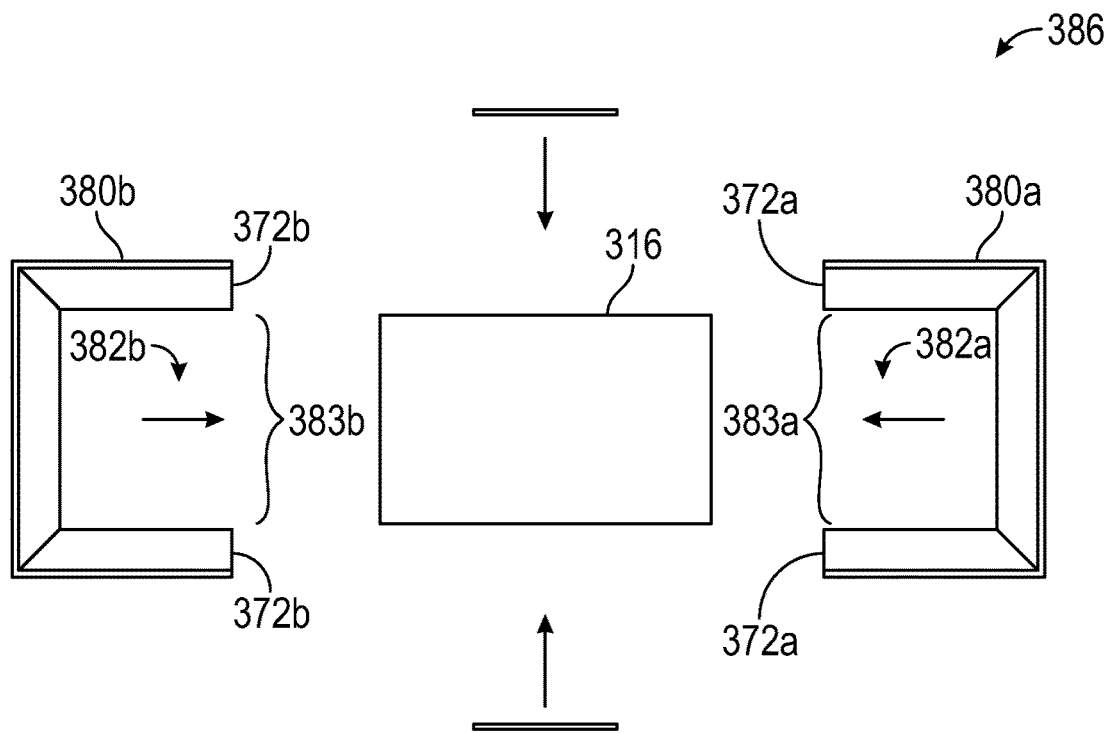
FIG. 18 is an end view of duct boards formed into opposing three-sided insulation envelopes, illustrating a cavity within the opposing three-sided insulation envelopes and configured to receive a section of uninsulated, existing ductwork.

It is contemplated that in certain instances the section of uninsulated, existing ductwork can have a cross-sectional area that is too large for the insulation assemblies 86, 186 or 286. In these instances, an insulation assembly can be formed from other structures. Referring now to FIG. 18, a plurality of three-sided envelopes 380*a*, 380*b* can be used to form an insulation assembly 386. The three-sided envelope 380*a* is a mirror image of the three-sided envelope 380*b*. In the illustrated, embodiment, the three-sided envelope 380*a*, is the same as, or similar to, the three-sided envelope 280 shown in FIG. 16 and described above. However, it should be appreciated that in other embodiments, the three-sided envelope 380*a* can be different from the three-sided envelope 280. The three-sided envelope 380*a*, includes a cavity 382*a* formed therewithin and an opening 383*a*. The cavity 382*a* has a rectangular or square cross-sectional shape corresponding to the rectangular or square cross-sectional shape of an intended ductwork to be insulated. The cavity 382*a* has a length and height corresponding to length and height of the intended ductwork.

Referring again to FIG. 18, edges 372*a*, 372*b* of the three-sided envelopes 380*a*, 380*b* have a square cross-sectional shape, that is, the edges 372*a*, 372*b* are not chamfered as are the edges 72 shown in FIGS. 4 and 12 and described above.

Figure 19:
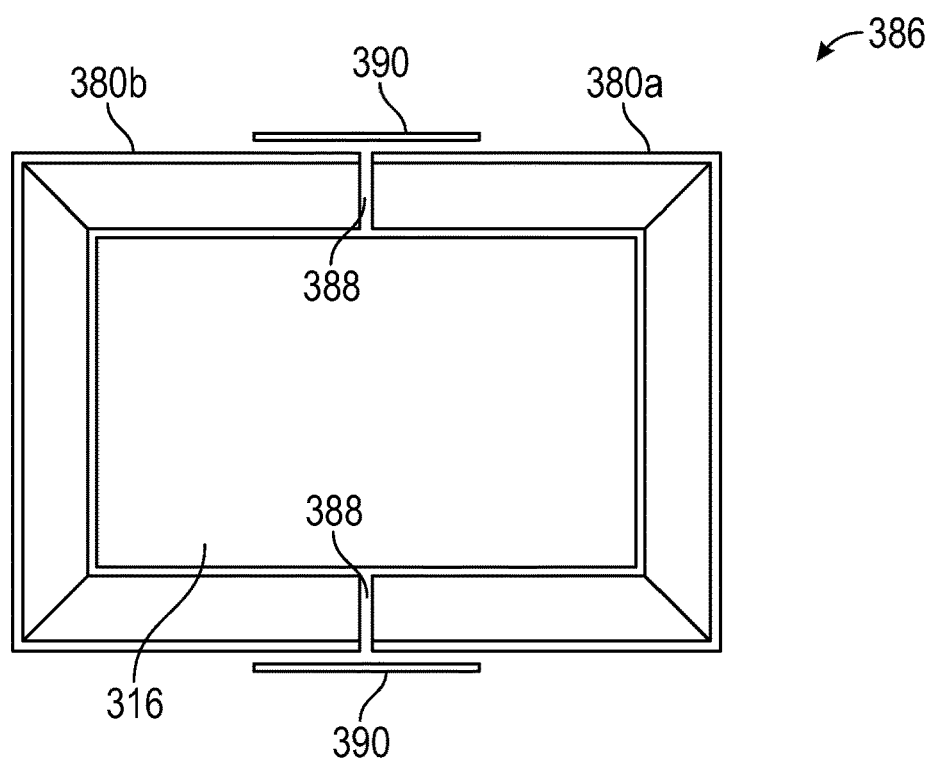
FIG. 19 is an end view of an insulation assembly formed from the opposing three-sided insulation envelopes of FIG. 18, having a section of uninsulated, existing ductwork seated within a cavity formed by the opposing three-sided insulation envelopes and thermoplastic strips used to seal openings between the opposing three-sided insulation envelopes.

Referring again to FIG. 18, the method of forming the insulation assembly 386 from the three-sided envelopes 380*a*, 380*b* includes the steps of placing the three-sided insulation envelopes 380*a*, 380*b* around a section 316 of uninsulated, existing ductwork in a manner such that the section 316 seats within the cavities 382*a*, 382*b* and the edges 372*a*, 372*b* seat against each other. Taken together, the three-sided insulation envelopes 380*a*, 380*b* form the insulation assembly 386, as shown in FIG. 19.

Referring again to FIG. 19, the insulation assembly 386 includes raw seams 388 where the edges 372*a*, 372*b* seat against each other. It is contemplated that the raw seams 388 can be sealed using a thermoplastic strip 390 or by welding as discussed above.

Figure 20:
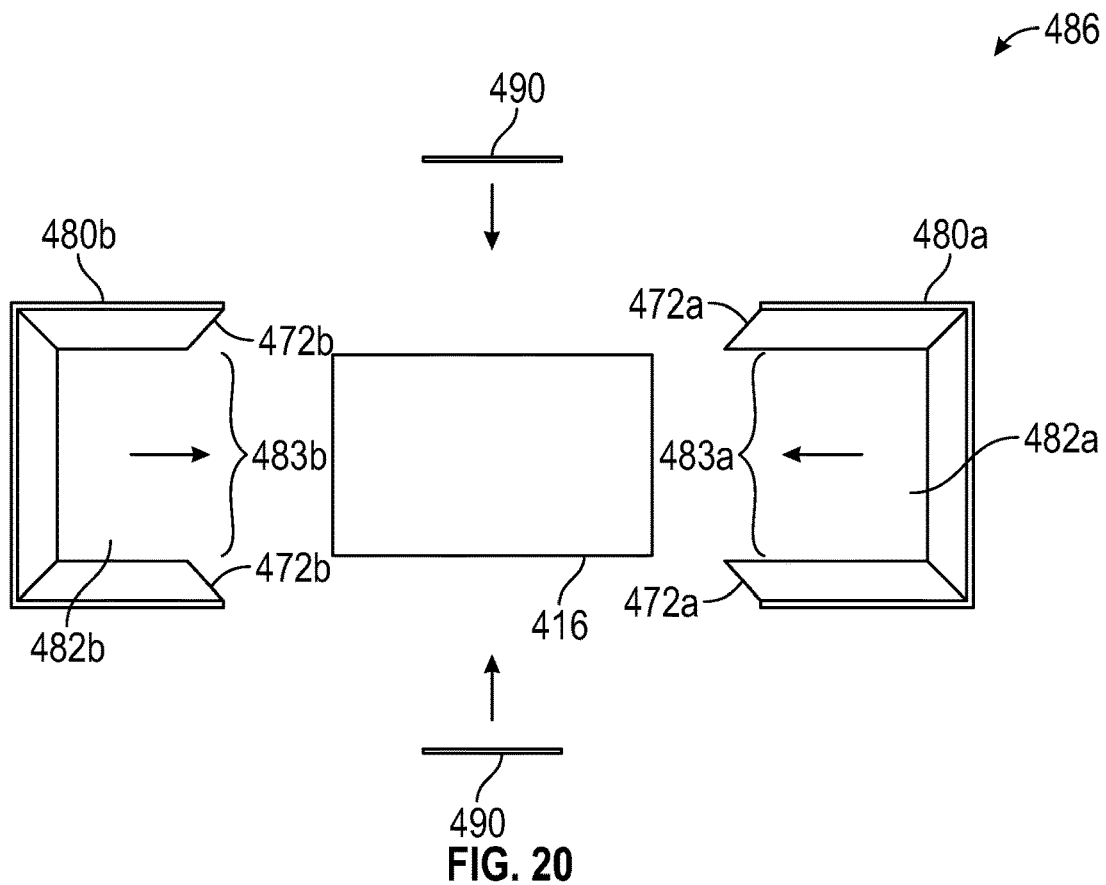
FIG. 20 is an end view of an insulation assembly formed by opposing three-sided insulation envelopes, illustrating a cavity within the opposing three-sided insulation envelopes and configured to receive a section of uninsulated, existing ductwork.
Figure 21:
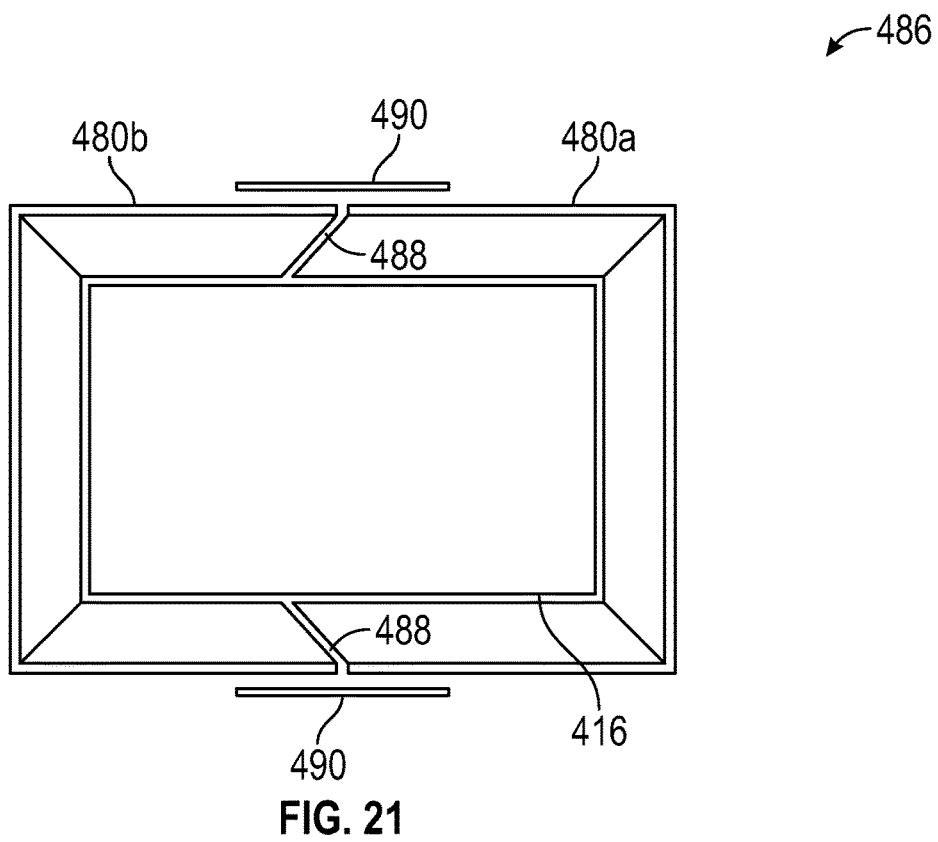
FIG. 21 is an end view of an insulation assembly formed from the opposing three-sided insulation envelopes of FIG. 20, having a section of uninsulated, existing ductwork seated within a cavity formed by the opposing three-sided insulation envelopes and thermoplastic strips used to seal openings between the opposing three-sided insulation envelopes.

Referring now to FIGS. 20 and 21, it is contemplated that the three-sided envelopes can have other seam structures, Referring first to FIG. 20, a plurality of three-sided envelopes 480*a*, 480*b* can be used to form an insulation assembly 486. In the illustrated embodiment, the three-sided envelope 480*a*, 480*b* are the same as, or similar to, the three-sided envelope 280 shown in FIG. 16 and described above with the exception that edges 472*a*, 472*b* are chamfered. The three-sided envelopes 480*a*, 480*b* each include a cavity 482*a*, 482*b* formed therewithin and an opening 483*a*, 483*b*. The cavities 482*a*, 482*b* each have a rectangular or square cross-sectional shape corresponding to the rectangular or square cross-sectional shape of an intended ductwork to be insulated. The cavities 482*a*, 482*b* each have a length and height corresponding to length and height of the intended ductwork.

Referring again to FIG. 20, the method of forming the insulation assembly 486 from the three-sided envelopes 480*a*, 480*b* includes the steps of placing the three-sided insulation envelopes 480*a*, 480*b* around a section 416 of uninsulated, existing ductwork in a manner such that the section 416 seats within the cavities 482*a*, 482*b* and the chamfered edges 472*a*, 472*b* seat against each other.

Referring again to FIG. 21, the insulation assembly 486 includes raw seams 488 where the chamfered edges 472*a*, 472*b* seat against each other. It is contemplated that the raw seams 488 can be sealed using a thermoplastic strip 490 or by welding as discussed above.

Figure 22:
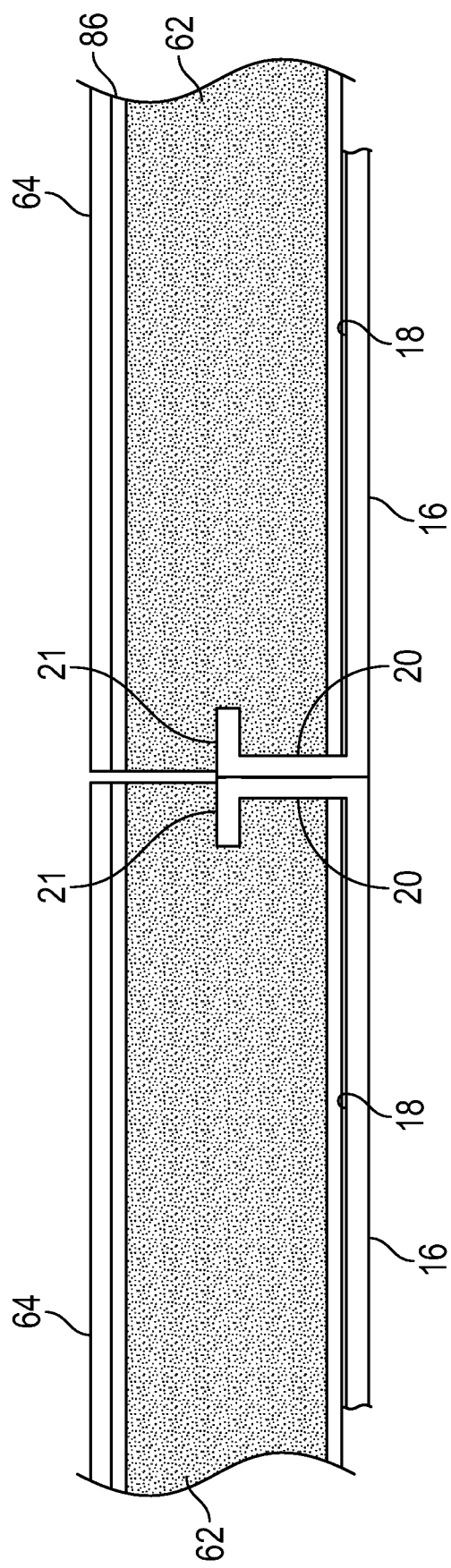
FIG. 22 is a side view of adjacent sections of uninsulated, existing ductwork, each having flanges, and a plurality of duct board configured to encapsulate the flanges.

Referring again to FIG. 1 and as discussed above, flanges 20 are typically formed at the ends of the sections 16 and used to connect adjacent sections 16 together. It is contemplated that the insulation assemblies 86, 186 can be used in a variety of manners at the ductwork locations where adjacent flanges seat against each other. Referring now to FIG. 22, a first embodiment of a use of adjacent insulation assemblies 86 in connection with adjacent flange assemblies is illustrated. Two sections 16 of uninsulated, existing ductwork are shown, with each having a flange 20 extending radially from the circumferential coverings 18. In the illustrated embodiment, each of the flanges 20 have axial segments 21. The insulation assemblies 86 have the same structure shown in FIG. 4 and described above with the exception that the thickness of the foam insulation panel 62 is increased such that the flanges 20, including the axial segments 21, are positioned within the body of the foam insulation panel 62. Adapting the insulation assemblies 86 in this manner advantageously insulates adjacent sections 16 at the flange 20 positions.

Figure 23:
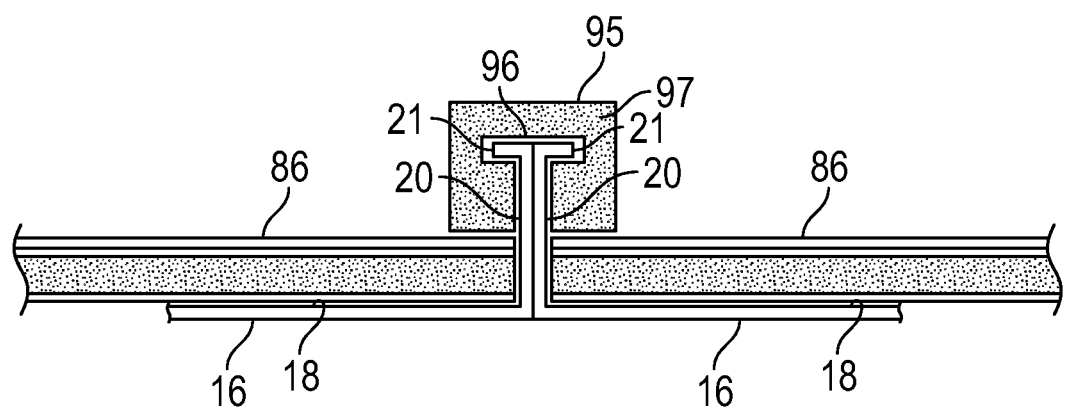
FIG. 23 is a side view of adjacent sections of uninsulated, existing ductwork, each having flanges, and an insulated flange cap configured to encapsulate the flanges.

Referring now to FIG. 23, another embodiment of using the insulation assemblies 86, 186 at the ductwork locations where adjacent flanges seat against each other. Two sections 16 of uninsulated, existing ductwork are shown, with each having a flange 20 extending radially from the circumferential coverings 18. In the illustrated embodiment, each of the flanges 20 have axial segments 21. The insulation assemblies 86 have the same structure shown in FIG. 4 and described above. The flanges 20, including the axial segments 21, are encapsulated by an insulated flange cap 95. The flange cap 95 includes a cavity 96 configured to receive the radial portions of the flanges 20 as well as the axial segments 21. The flange cap 95 includes insulation 97 configured to insulate adjacent sections 16 at the flange 20 positions. The insulation 97 can have any suitable form, including the non-limiting examples of foam insulation and loosefill insulation. The insulated flange cap 95 can have any desired shape and size sufficient to insulate adjacent sections 16 at the flange 20 positions. Use of the insulated flange cap 95 advantageously insulates adjacent sections 16 at the flange 20 positions.

Figure 24:
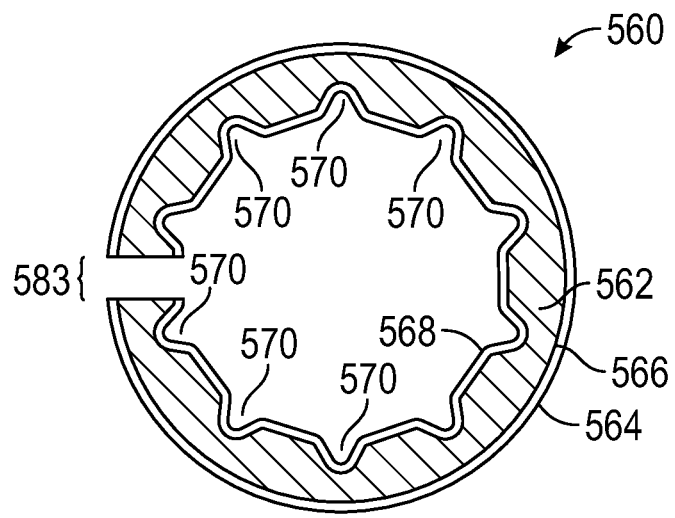
FIG. 24 is a plan view of a third embodiment of a duct board configured with an arcuate cross-sectional shape.

While the embodiments of the insulation assemblies 86, 186 shown in FIGS. 7-10 and 15 are intended for uninsulated, existing ductwork having a rectangular or square cross-sectional shape, it is contemplated that an insulation assembly can be formed for uninsulated, existing ductwork have a circular cross-sectional shape. Referring now to FIG. 24, another alternate duct board according to the present invention is indicated generally at 560. The duct board 560 includes a layer of foam insulation panel 562, a sheet of thermoplastic polymer 564 and opposing facing sheets 566 and 568. In the illustrated embodiment, the layer of foam insulation panel 562, the sheet of thermoplastic polymer 564 and opposing facing sheets 566 and 568 are the same as, or similar to, the layer of foam insulation panel 62, a sheet of thermoplastic polymer 64 and opposing facing sheets 66 and 68 shown in FIGS. 3 and 4 and described above. However, it should be appreciated that in other embodiments, the layer of foam insulation panel 562, the sheet of thermoplastic polymer 564 and opposing facing sheets 566 and 568 can be different from the layer of foam insulation panel 62, a sheet of thermoplastic polymer 64 and opposing facing sheets 66 and 68.

Referring again to FIG. 24, a plurality of V-shaped grooves, indicated at 570, have been formed in the duct board 560 in a manner such as to allow the duct board 560 to be bent into an arcuate shape.

Figure 25:
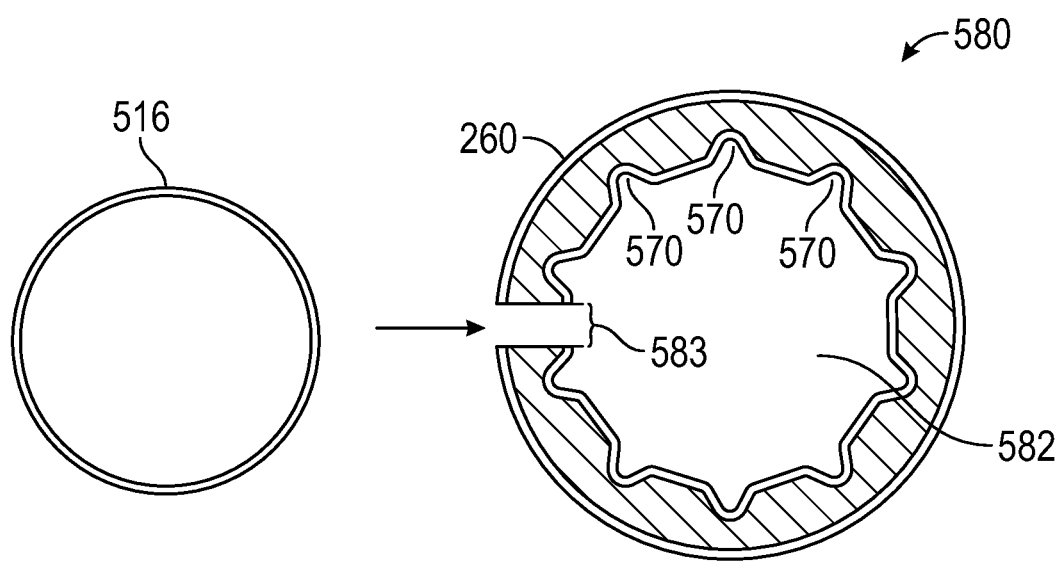
FIG. 25 is an end view of the duct board of FIG. 24 and an uninsulated, existing ductwork section having a circular cross-sectional shape.
Figure 26:
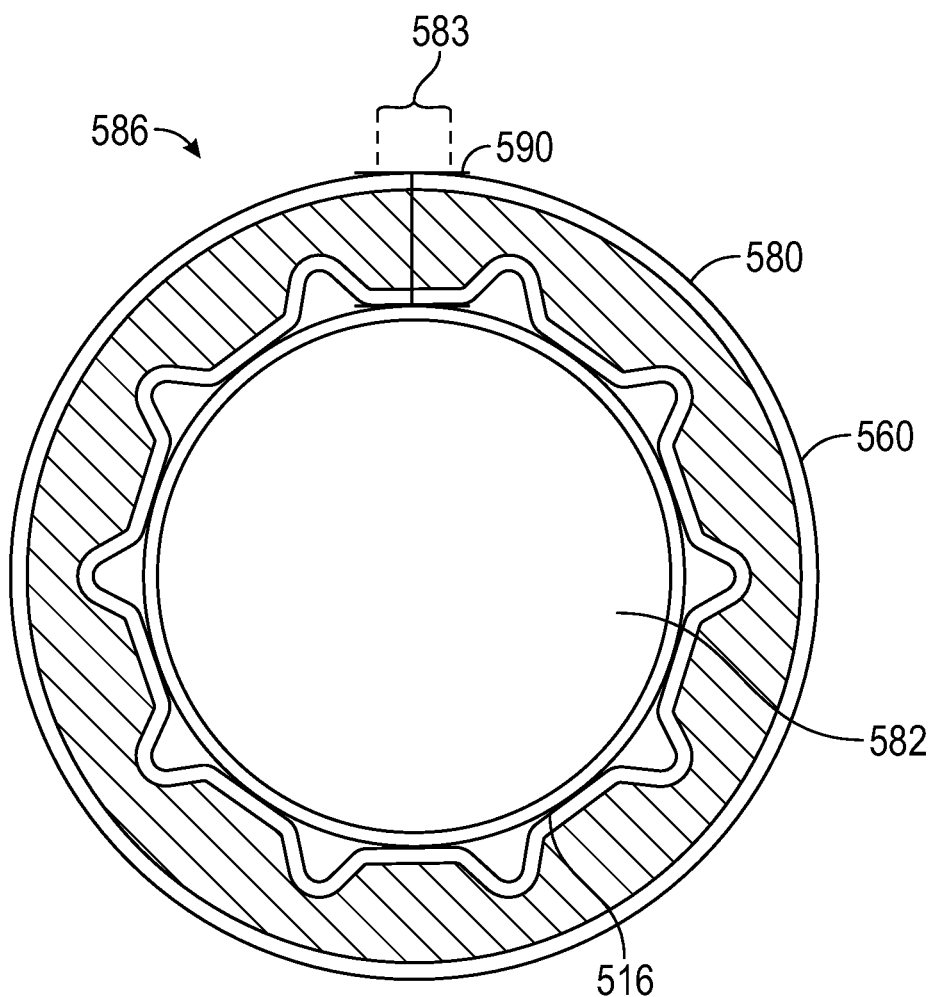
FIG. 26 is an end view of an insulation assembly having a section of uninsulated, existing ductwork seated within a cavity formed by the duct board of FIG. 24.

Referring now to FIGS. 25 and 26, the method of forming the duct board 560 into an insulating assembly will now be discussed. Referring initially to FIG. 25 in first step, the duct board 560 is folded along the plurality of V-shaped grooves 570 until the duct board 560 has the arcuate or circular cross-sectional shape. Referring again to FIG. 25, the folded duct board 560 forms a circular insulation envelope 580. The circular insulation envelope 580 forms a cavity 582 therewithin and an opening 583. The cavity 582 has a circular cross-sectional shape corresponding to the circular cross-sectional shape of an intended ductwork to be insulated. The cavity 582 has a diameter corresponding to the diameter of the intended ductwork.

Referring again to FIG. 25 in a next step, the circular insulation envelope 580 is installed on a section 516 of uninsulated, existing ductwork by extending the opening 583 in the circular insulation envelope 580 in a manner such that the circular insulation envelope 580 can be positioned to cover the section 516 such that the section 516 seats within the cavity 582.

Referring now to FIG. 26, the circular insulation envelope 580 is shown encapsulating the section 516 with the section 516 positioned within the cavity 582. The opposing portions of the circular insulation envelope 580 adjacent the opening 583 form edges. The edges and the opening 583 can be sealed with sealing structures, such as the non-limiting examples of tape 590, clips, bands and the like. Taken together, the circular insulation envelope 580 and the sealing structure 590 form an insulation assembly 586.

The insulation assemblies 86, 186, 286, 386, 486 and 586 provide many benefits, although not all benefits may be available in all embodiments. First, the insulation assemblies advantageously allow insulation of uninsulated, existing ductwork without disruption of the uninsulated, existing ductwork. Second, the insulation assemblies advantageously allow insulation of uninsulated, existing ductwork without disruption of the air flowing through the uninsulated, existing ductwork. Third, the insulation assemblies provide for insulation of the flanges connecting typical sections of uninsulated, existing ductwork. Finally, the insulation assemblies are configured to limit typical leakage and conduction-loss problems associated with uninsulated, existing ductwork.

While the insulation assemblies shown in FIGS. 1-26 have been described above in the context of application to existing ductwork, it is within the contemplation of the invention that the insulation assemblies can be applied to new ductwork.

In accordance with the provisions of the patent statutes, the principle and mode of operation of the novel insulation structures, systems and methods for uninsulated, existing ductwork have been explained and illustrated in certain embodiments. However, it must be understood that the novel insulation structures, systems and methods for uninsulated, existing ductwork may be practiced otherwise than as specifically explained and illustrated without departing from its spirit or scope.

What is claimed is:

1. An insulation assembly comprising: a three-sided insulation envelope configured to form a cavity, the cavity configured to receive a section of uninsulated, existing duct work, the three-sided insulation envelope forming an opening; and a discrete insulation cap, separate and apart from the three-sided insulation envelope is configured to seat against the three-sided insulation envelope thereby encapsulating the uninsulated, existing ductwork and sealing the opening;

wherein the three-sided insulation envelope is formed from a folded duct board.

2. The insulation assembly of claim 1, wherein the three-sided insulation envelope includes a thermoplastic polymer sheet, a plurality of facing sheets and a layer of foam insulation.

3. The insulation assembly of claim 1, wherein the insulation cap includes a thermoplastic polymer sheet, a plurality of facing sheets and a layer of foam insulation.

4. The insulation assembly of claim 1, wherein the three-sided insulation envelope and the insulation cap are formed from the same duct board material.

5. The insulation assembly of claim 1, wherein the three-sided insulation envelope has chamfered ends.

6. The insulation assembly of claim 1, wherein the insulation cap has chamfered ends.

7. The insulation assembly of claim 1, wherein chamfered ends of the three-sided insulation envelope are configured to receive and mate with chamfered ends of the insulation cap.

8. The insulation assembly of claim 1, wherein edges of the three-sided insulation envelope and the insulation cap are covered with one or more thermoplastic right-angle strips.

9. The insulation assembly of claim 1, wherein edges of the three-sided insulation envelope and the insulation cap are sealed by welding.

10. The insulation assembly of claim 1, wherein flanges extending from adjacent sections of uninsulated, existing ductwork are encapsulated by an insulated flange cap.

11. A method of using an insulation assembly comprising the steps of: forming a cavity with a three-sided insulation envelope, the cavity configured to receive a section of uninsulated, existing duct work, the three-sided insulation envelope forming an opening; and seating a discrete insulation cap, separate and apart from the three-sided insulation envelope against the three-sided insulation envelope, thereby encapsulating the uninsulated, existing ductwork and sealing the opening; and including the step of forming the three-sided insulation envelope from a folded duct board.

12. The method of claim 11, wherein the folded duct board includes a plurality of V-shaped grooves.

13. The method of claim 11, including the step of forming the three-sided insulation envelope and the insulation cap from the same duct board material.

14. The method of claim 11, wherein edges of the three-sided insulation envelope and the insulation cap are covered with one or more thermoplastic right-angle strips.

15. An insulation assembly comprising:
a first three-sided insulation envelope configured to form a first cavity, the first cavity configured to receive a first section of uninsulated, existing duct work, the first three-sided insulation envelope forming a first opening;
a second three-sided insulation envelope configured to form a second cavity, the second cavity configured to receive a second section of uninsulated, existing duct work, the second three-sided insulation envelope forming a second opening, the second three-sided insulation envelope seated against the first three-sided insulation envelope;
a first strip configured to cover a first joint between the first three-sided insulation envelope and the second three-sided envelope; and
a second strip configured to cover a second joint between the first three-sided insulation envelope and the second three-sided envelope.

16. The insulation assembly of claim 15, wherein each of the first three-sided insulation envelope and the second three-sided insulation envelope includes a thermoplastic polymer sheet, a plurality of facing sheets and a layer of foam insulation.

17. The insulation assembly of claim 15, wherein the first three-sided insulation envelope and the second three-sided insulation envelope are formed from the same duct board material.

18. The insulation assembly of claim 15, wherein flanges extending from adjacent sections of uninsulated, existing ductwork are encapsulated by an insulated flange cap.

* * * * *